United States Patent
Takahashi et al.

(10) Patent No.: US 9,933,008 B2
(45) Date of Patent: Apr. 3, 2018

(54) BALL JOINT AND STEERING DEVICE INCLUDING THE SAME

(71) Applicant: JTEKT CORPORATION, Osaka-shi, Osaka (JP)

(72) Inventors: Shuji Takahashi, Yamatokoriyama (JP); Akihiro Toshima, Nabari (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/693,339

(22) Filed: Apr. 22, 2015

(65) Prior Publication Data

US 2015/0330440 A1    Nov. 19, 2015

(30) Foreign Application Priority Data

May 15, 2014   (JP) ................. 2014-101524

(51) Int. Cl.
*B62D 7/22*   (2006.01)
*F16C 11/06*   (2006.01)
(Continued)

(52) U.S. Cl.
CPC .......... *F16C 11/0623* (2013.01); *B62D 7/163* (2013.01); *B62D 7/228* (2013.01);
(Continued)

(58) Field of Classification Search
CPC .. F16C 11/0623; F16C 11/0695; B62D 7/163; B62D 7/22; B62D 7/222;
(Continued)

(56) References Cited

U.S. PATENT DOCUMENTS

| | | | | |
|---|---|---|---|---|
| 4,995,755 A | * | 2/1991 | Hyodo ................. | B62D 7/163 29/510 |
| 5,788,009 A | * | 8/1998 | Lee ..................... | B62D 3/12 180/428 |

(Continued)

FOREIGN PATENT DOCUMENTS

| DE | 1916576 A1 | 1/1971 |
|---|---|---|
| DE | 3631592 A1 | 3/1988 |

(Continued)

OTHER PUBLICATIONS

Oct. 13, 2015 Extended Search Report issued European Patent Application No. 15165494.4.

(Continued)

*Primary Examiner* — Keith Frisby
(74) *Attorney, Agent, or Firm* — Oliff PLC (57) ABSTRACT

A rack-and-pinion type steering device includes a ball joint for connecting a rack shaft and a tie rod. The ball joint includes a socket and a ball. The socket is provided with a regulated surface allowed to contact a regulating surface of a rack housing, and a screw projecting from the regulated surface to be connected to the rack shaft. The regulated surface includes an intermediate portion having a curved surface shape that recedes from a regulating surface in a longitudinal direction of the rack shaft toward the outer circumference, and the regulated surface has such a shape that a pointed portion toward the regulating surface is less likely to be formed on the regulated surface even if a processing error occurs in the processing for forming the regulated surface of the socket.

7 Claims, 7 Drawing Sheets

30 : RACK SHAFT   51 : SOCKET
40 : RACK HOUSING   53 : SCREW
42 : REGULATING SURFACE   54 : REGULATED SURFACE
50 : BALL JOINT   61 : BALL (51) Int. Cl.
    *B62D 7/16*     (2006.01)
    *B62D 3/12*     (2006.01)
    *F16H 19/04*     (2006.01)

(52) U.S. Cl.
    CPC ............ *F16C 11/0695* (2013.01); *B62D 3/12* (2013.01); *F16H 2019/046* (2013.01); *Y10T 74/20* (2015.01); *Y10T 403/32631* (2015.01)

(58) Field of Classification Search
    CPC ........ B62D 7/224; B62D 7/226; B62D 7/228; B62D 5/22; B62D 3/12; F16H 2019/046; Y10T 403/32631
    USPC ...................................... 280/93.511; 403/122
    See application file for complete search history.

(56) References Cited

U.S. PATENT DOCUMENTS

| | | | | |
|---|---|---|---|---|
| 9,156,493 | B1* | 10/2015 | Kimijima | ............ B62D 3/126 |
| 2005/0184480 | A1* | 8/2005 | Arlt | ......................... B62D 3/12 |
| | | | | 280/89.12 |
| 2009/0236812 | A1* | 9/2009 | Mahlmann | ............... B62D 3/12 |
| | | | | 280/93.502 |
| 2010/0284733 | A1 | 11/2010 | Ungruh et al. | |

FOREIGN PATENT DOCUMENTS

| | | | |
|---|---|---|---|
| FR | 2238860 A1 | 2/1975 | |
| FR | 2436278 A1 | 4/1980 | |
| FR | 2737176 A1 * | 1/1997 | ............... B62D 3/12 |
| JP | S61-007669 U | 1/1986 | |
| JP | S61-084078 U | 6/1986 | |
| JP | H11-342854 A | 12/1999 | |
| JP | 2002-346689 A | 12/2002 | |
| JP | 2007-015516 A | 1/2007 | |
| JP | 2014-080147 A | 5/2014 | |

OTHER PUBLICATIONS

Jan. 23, 2018 Office Action issued in Japanese Patent Application No. 2014-101524.

* cited by examiner

30 : RACK SHAFT
40 : RACK HOUSING
42 : REGULATING SURFACE
50 : BALL JOINT
51 : SOCKET
53 : SCREW
54 : REGULATED SURFACE
61 : BALL

BALL JOINT AND STEERING DEVICE INCLUDING THE SAME

INCORPORATION BY REFERENCE

The disclosure of Japanese Patent Application No. 2014-101524 filed on May 15, 2014 including the specification, drawings and abstract, is incorporated herein by reference in its entirety.

BACKGROUND OF THE INVENTION

1. Field of the Invention

The invention relates to a ball joint including a socket connected to a shaft and a ball fitted in the socket, and a steering device including the same.

2. Description of Related Art

Japanese Patent Application Publication No. H11-342854 (JP H11-342854 A) describes an example of a steering device including a ball joint. The steering device includes a rack shaft, and a ball joint. The rack shaft is accommodated in a rack housing. The ball joint couples the rack shaft and a tie rod to each other. The ball joint includes a ball and a socket. The ball is formed at an end of the tie rod. The socket accommodates the ball. A regulating surface, which is an end face for regulating the movement of the rack shaft, is formed at an end of the rack housing. A regulated surface, which is an end face facing the regulating surface of the rack shaft, is formed on the socket.

The rack shaft moves in a direction while the regulating surface of the rack housing and the regulated surface of the socket are not contacting each other. The regulated surface of the socket thereby approaches the regulating surface of the rack housing. The regulated surface of the socket then comes into contact with the regulating surface of the rack housing. The movement of the rack shaft coupled to the socket is thereby regulated.

According to tests conducted by the inventors of the present application, the steering device may generate a loud abnormal noise due to a stick-slip. The following is considered as the reason therefor. The regulating surface of the rack housing and the regulated surface of the socket are brought into contact with each other while a force of deflecting the rack shaft is acting on the rack shaft. When the movement of the rack shaft is regulated, the regulated surface of the socket is strongly pushed against the regulating surface of the rack housing. Such force is, for example, generated based on a reactive force the rack shaft receives from a turning wheel side through the tie rod when the turning wheel is turning.

When the regulated surface is formed through processing on the socket at a manufacturing stage of the ball joint, a pointed portion pointed toward the regulating surface side of the housing may be formed on the regulated surface due to processing errors.

A socket including such pointed portion is thus formed. In the steering device in which the ball joint including such socket is connected to the rack shaft, the pointed portion of the socket bites into the regulating surface of the housing when the regulated surface of the socket is strongly pushed against the regulating surface of the rack housing as described above.

The rack shaft deforms thereafter so as to eliminate the deflection of the rack shaft. Accompanying therewith, the pointed portion of the socket is moved on the regulating surface of the rack housing while contacting the regulating surface. The stick-slip thus occurs, which produces abnormal noise. The problem has been discussed using the steering device as an example. However, the problem similar to the above is assumed to arise in a steering system including a shaft that moves in a longitudinal direction and a ball joint connected to the shaft.

SUMMARY OF THE INVENTION

It is one of the objects of the present invention to provide a ball joint in which a stick-slip is less likely to occur, and a steering device including the joint.

According to an aspect of the present invention, a ball joint includes: a socket that is provided with a regulated surface which is an end face allowed to contact a regulating member arranged at a periphery of a shaft, and that is provided with a connecting portion projecting from the regulated surface to be connected to the shaft or to which the connecting portion is attached, the regulated surface contacting a regulating surface that is an end face formed on the regulating member so that movement of the shaft is regulated; and a ball fitted in the socket. In the ball joint, the regulated surface has a shape that recedes with respect to the regulating surface in an axial direction toward a radially outer side of the socket from a base of the connecting portion in the regulated surface or from a position at a predetermined distance away from the base in a radial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A configuration of a steering device 1 used in an automobile (not shown), for example, will be described with reference to FIG. 1. The steering device 1 includes a steering mechanism 10 and a rack-and-pinion type turning mechanism 20. The steering mechanism 10 is connected to a steering wheel 2. The turning mechanism 20 is connected to the steering mechanism 10 to steer turning wheels 3.

The steering mechanism 10 includes a steering shaft 11 serving as a rotation shaft of the steering wheel 2. The steering shaft 11 includes a column shaft 12, an intermediate shaft 13, and a pinion shaft 14. Teeth 14A are formed at a lower part of the pinion shaft 14. The column shaft 12 is coupled to the steering wheel 2. The intermediate shaft 13 is coupled to a lower end portion of the column shaft 12. The pinion shaft 14 is coupled to a lower end portion of the intermediate shaft 13.

The turning mechanism 20 includes a rack shaft 30, and a rack housing 40 that is arranged at the periphery of the rack shaft 30 to cover the rack shaft 30. The rack housing 40 is made of, for example, aluminum, light alloy material, or the like. Teeth 31 are formed at a portion of the rack shaft 30. The teeth 14A of the pinion shaft 14 and the teeth 31 of the rack shaft 30 mesh with each other to configure a rack-and-pinion mechanism.

Each end 32 of the rack shaft 30 is connected to the corresponding turning wheel 3 by way of a ball joint 50, a tie rod 60, and the like. The rack shaft 30 and the tie rod 60 are coupled by the ball joint 50 so that the tie rod 60 is rotatable with respect to the rack shaft 30.

With the steering mechanism 10 and the turning mechanism 20, when the steering wheel 2 is operated, the column shaft 12, the intermediate shaft 13, and the pinion shaft 14 are integrally rotated. A rotational movement of the pinion shaft 14 is converted to a longitudinal movement of the rack shaft 30 by way of the rack-and-pinion mechanism. The movement of the rack shaft 30 causes the turning wheels 3 to turn by way of the ball joint 50, the tie rod 60, and the like.

Figure 2:
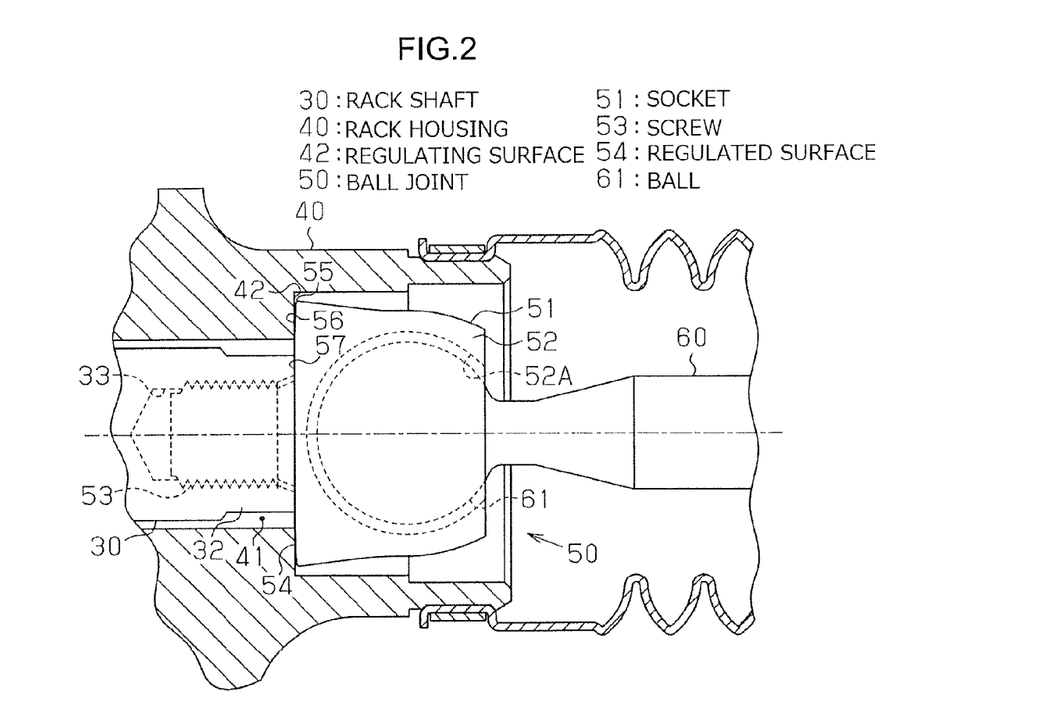
FIG. 2 is a sectional view of an accommodation structure of a ball joint of the steering device according to the embodiment of the present invention.

The ball joint 50 and an accommodation structure of the ball joint 50 will be described with reference to FIGS. 2 to 4. As shown in FIG. 2, an internal space 41 of the rack housing 40 has a level difference that is formed by enlarging the diameter of the internal space 41 at its end. A regulating surface 42 orthogonal to the longitudinal direction of the rack shaft 30 is formed of such level difference.

The ball joint 50 includes a socket 51 and a ball 61. The socket 51 is fixed to the rack shaft 30. The ball 61 is formed at an end of the tie rod 60 so as to be integral therewith. The socket 51 is made of a material having a higher hardness than the rack housing 40, for example, an iron material.

The socket 51 includes a screw 53 and a base portion 52. The screw 53 is a connecting portion that is screwed into a screw hole 33 formed at the end 32 of the rack shaft 30 to be connected to the rack shaft 30. The base portion 52 includes a hole 52A, into which the ball 61 is fitted. The screw 53 projects from a regulated surface 54 formed on the opposite side of the base portion 52 from the hole 52A.

Figure 3:
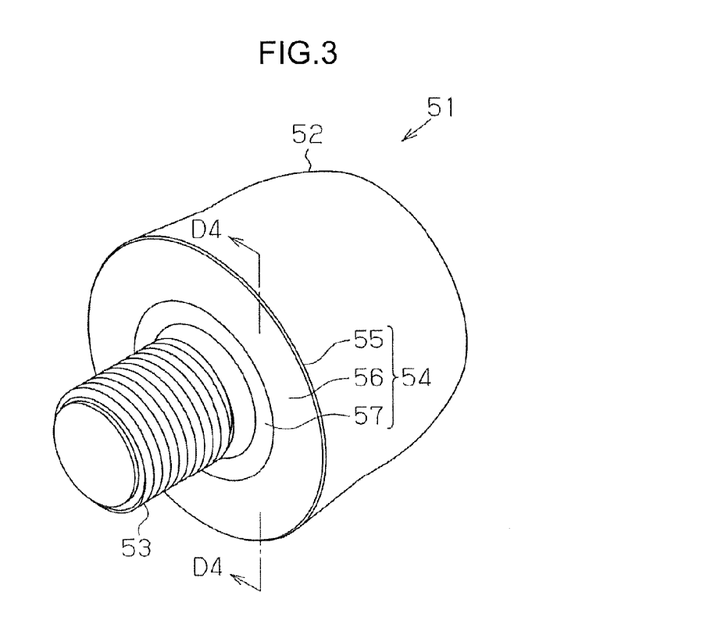
FIG. 3 is a perspective view of a socket according to the embodiment of the present invention.

As shown in FIG. 3, the regulated surface 54 includes a chamfered outer circumferential edge 55, an intermediate portion 56, and a center screw vicinity portion 57. The intermediate portion 56 is contiguous to the outer circumferential edge 55 on an inner circumferential side of the outer circumferential edge 55. The screw vicinity portion 57 is contiguous to the intermediate portion 56 on the inner circumferential side of the intermediate portion 56, and is positioned in the vicinity of the screw 53. A boundary between the screw vicinity portion 57 and the intermediate portion 56 is provided at a predetermined distance away from a base of the screw 53. An outer diameter of the screw vicinity portion 57 is, for example, substantially equal to an outer diameter of the end face of the rack shaft 30 (see FIG. 2).

A relationship between the regulated surface 54 and the regulating surface 42 when a force in a direction orthogonal to the longitudinal direction of the rack shaft 30 (hereinafter referred to as "direction orthogonal to the axial direction") acts on the rack shaft 30 will be described with reference to FIG. 4.

Figure 1:
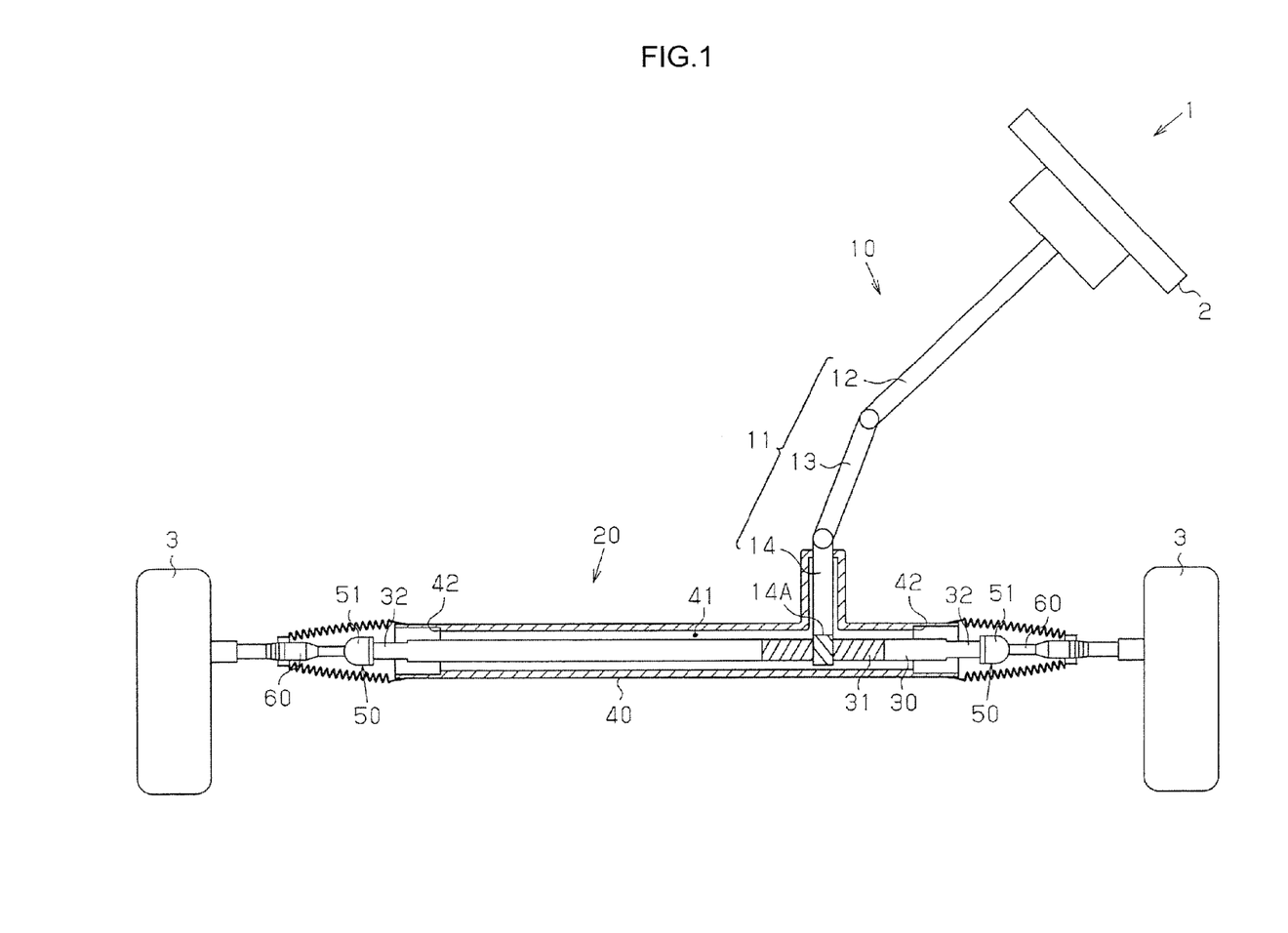
FIG. 1 is a configuration diagram of a steering device according to an embodiment of the present invention.

For example, when the rack shaft 30 is moved in the longitudinal direction to steer the turning wheel 3 (see FIG. 1), the tie rod 60 receives a pull force F due to a reactive force from a tire of the turning wheel 3 (see FIG. 1). The rack shaft 30 deflects due to a component FA of the pull force F in the direction orthogonal to the axial direction. The regulated surface 54 and the regulating surface 42 are brought into contact with each other in this state. This regulates further movement of the rack shaft 30.

For example, as shown in FIG. 1, when a torque is input from the pinion shaft 14 to the rack shaft 30, a clearance between the teeth 14A of the pinion shaft 14 and the teeth 31 of the rack shaft 30 cause the rack shaft 30 to deflect at the portion of clearance in the direction orthogonal to the axial direction, which is the direction orthogonal to a tooth trace of the teeth 31.

For example, when the torque is input from the pinion shaft 14 to the rack shaft 30, the rack shaft 30 shifts at the portion of the teeth 31 in the direction orthogonal to the axial direction, which is the tooth trace direction and deflects.

Figure 4:
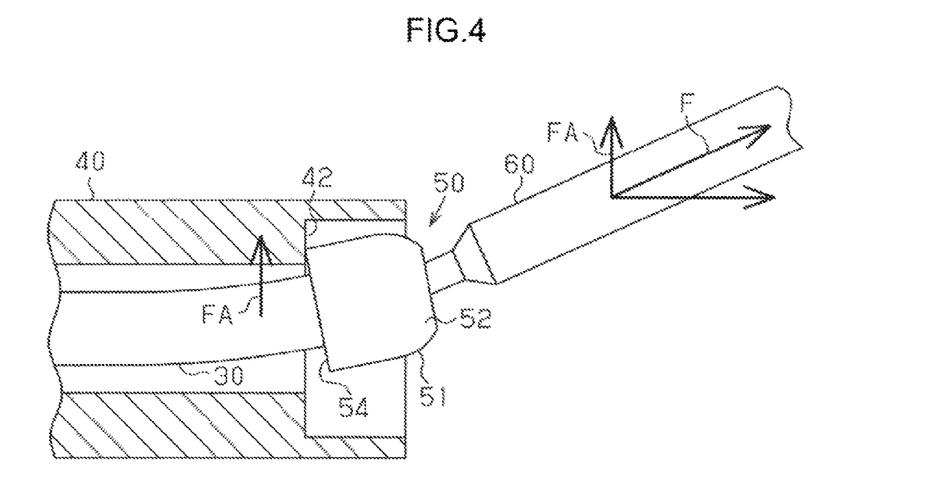
FIG. 4 is a schematic view showing a relationship between a regulating surface and a regulated surface when a rack shaft according to the embodiment of the present invention is deflected.

According to the tests conducted by the inventors, the force acting on the) rack shaft 30 in the direction orthogonal to the axial direction decreases or disappears while the regulated surface 54 is being pushed against the regulating surface 42, as shown in FIG. 4. It was thus found that a loud abnormal noise due to the stick-slip may occur when the deflection of the rack shaft 30 is eliminated.

Figure 5:
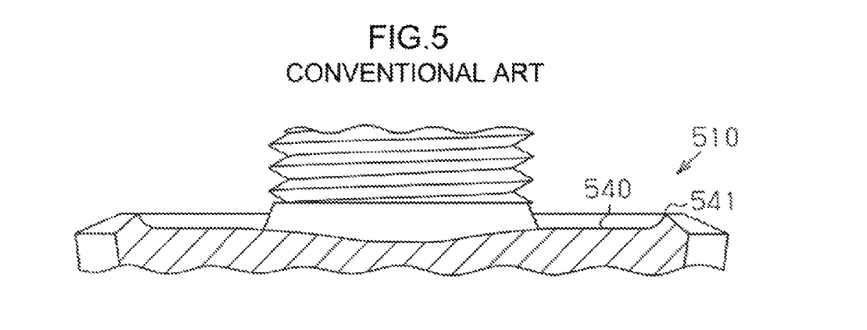
FIG. 5 is a sectional view showing a regulated surface of a conventional example, exaggerated in a height direction.

The inventors focused on a fact that the stick-slip occurs when a difference between a maximum static friction force and a dynamic friction force that are generated between the regulated surface 54 and the regulating surface 42 is large. The inventors obtained the following knowledge by measuring the height of a regulated surface 540 of a socket 510 in a conventional example (hereinafter referred to as "conventional regulated surface 540") at a μm level. In other words, as shown in FIG. 5, a microscopic edge 541, which is a pointed portion, may be formed on the conventional regulated surface 540 at a part of the conventional regulated surface 540 due to a processing method of the conventional regulated surface 540 or the like. This is assumed to be because when the conventional regulated surface 540 is processed into a planar shape, a microscopic inclination, in which the height increases from the inner circumferential side toward the outer circumferential side, may be formed due to a processing error. FIG. 5 shows the height in the axial direction of the screw 53 of the conventional regulated surface 540 in an exaggerated manner. Thus, the actual size of the edge 541 with respect to the diameter of the conventional regulated surface 540 is smaller than that shown in FIG. 5.

Figure 6:
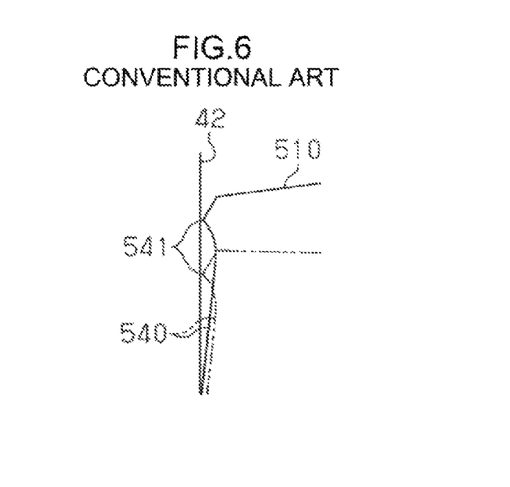
FIG. 6 is an operation diagram showing an operation of the regulated surface and a regulating surface of the conventional example.

As shown in FIG. 6, when the deflection of the rack shaft 30 is eliminated while the conventional regulated surface 540 is being pushed against the regulating surface 42, the edge 541 moves from a position indicated by a continuous line to a position indicated by a long dashed double-short dashed line while rubbing against the regulating surface 42. The edge 541 is more likely to strongly bite into the regulating surface 42. Thus, the maximum static friction force between the conventional regulated surface 540 and the regulating surface 42 becomes larger due to the maximum static friction force between the edge 541 and the regulating surface 42. Thus, the difference between the maximum static friction force and the dynamic friction force that are generated between the conventional regulated surface 540 and the regulating surface 42 becomes large, and the stick-slip is assumed to occur.

Figure 7:
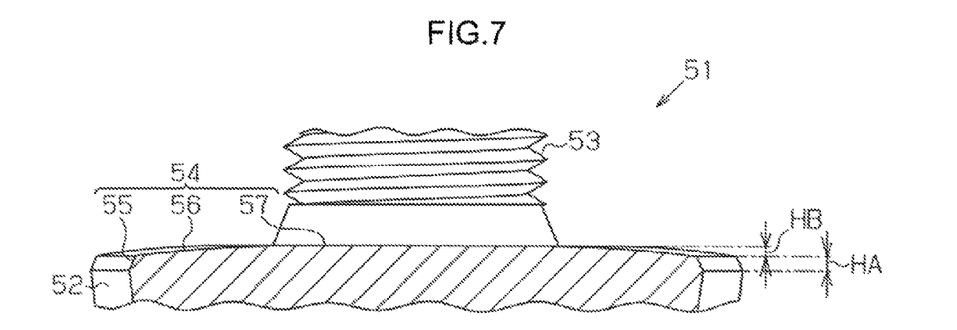
FIG. 7 is a sectional view taken along line D4-D4 of FIG. 3 showing an intermediate portion of the regulated surface according to the embodiment of the present invention, exaggerated in the height direction.

The inventors set the shape of the regulated surface 54 on the basis of the knowledge described above. In other words, as shown in FIG. 7, the screw vicinity portion 57 is orthogonal to the axial direction of the screw 53. The intermediate portion 56 is curved with respect to the axial direction of the screw 53 so as to descend from the screw vicinity portion 57 side toward the outer circumferential edge 55, that is, so as to recede from the regulating surface 42 (see FIG. 2), to form a curved surface. A height HB that is a level difference between a portion of the intermediate portion 56 on the radially innermost side and a portion of the intermediate portion 56 on the radially outermost side is smaller than a height HA that is a level difference between a portion of the outer circumferential edge 55 on the radially innermost side and a portion of the outer circumferential edge 55 on the radially outermost side. FIG. 7 shows the height of the intermediate portion 56 in the axial direction of the screw 53 in an exaggerated manner. Thus, a difference between the height HA and the height HB is smaller than that shown in the figure. For example, about 1 to 30 µm can be adopted for the height HB.

Figure 8:
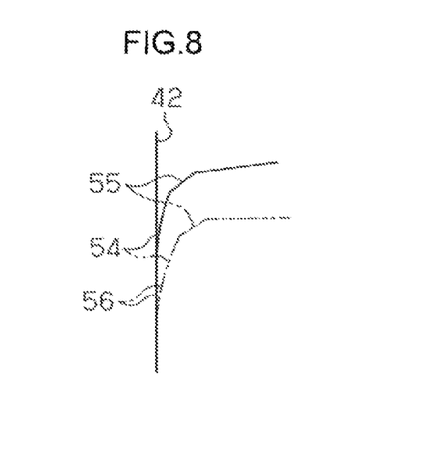
FIG. 8 is an operation diagram showing an operation of the regulated surface and the regulating surface according to the embodiment of the present invention.

As shown in FIG. 8, when the deflection of the rack shaft 30 is eliminated while the regulated surface 54 is being pushed against the regulating surface 42, the regulated surface 54 moves from a position indicated by a continuous line to a position indicated by a long dashed double-short dashed line while rubbing against the regulating surface 42. The regulated surface 54 is provided with the intermediate portion 56 having a curved surface shape. Thus, a smooth continuation from the intermediate portion 56 to the outer circumferential edge 55 is realized. Therefore, the maximum static friction force between the regulated surface 54 and the regulating surface 42 is small compared to the conventional regulated surface 540 (see FIG. 6) in which the edge 541 is formed.

The operation of the regulated surface 54 will be described with reference to FIG. 9.

Figure 9:
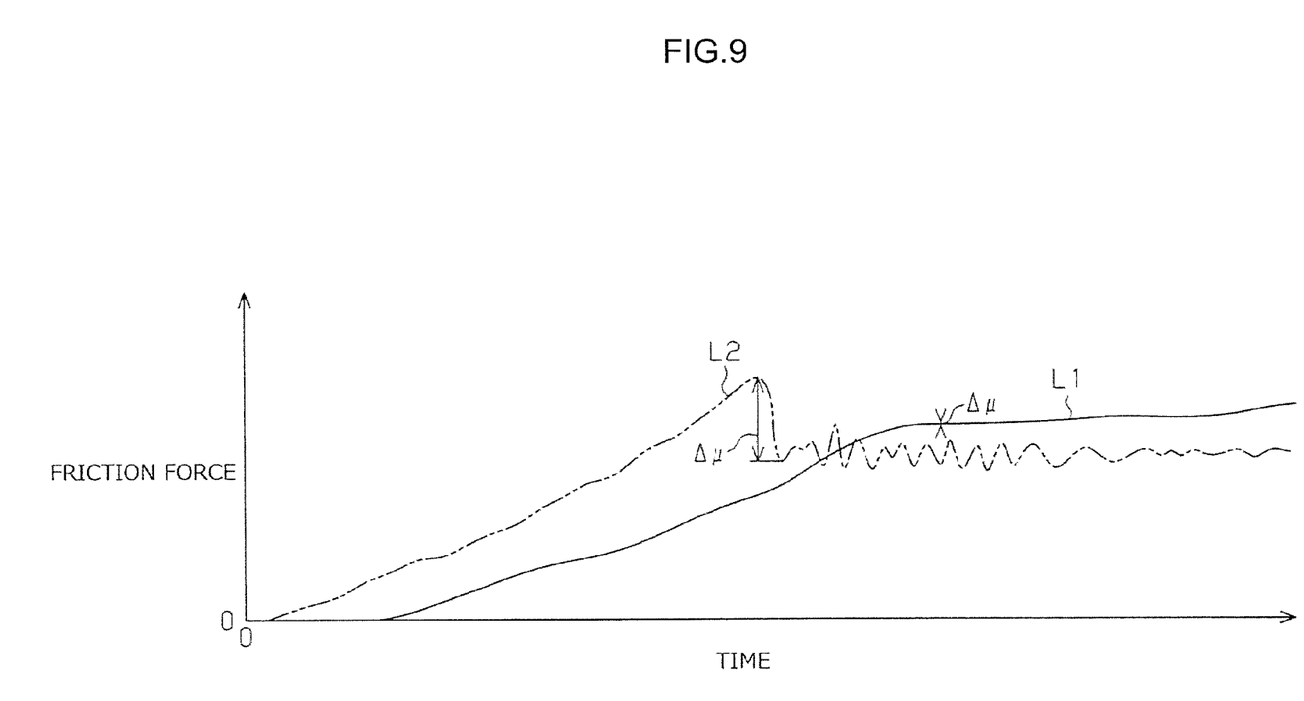
FIG. 9 is a graph showing a relationship of friction and displacement amount between the regulated surface and the regulating surface according to the embodiment of the present invention.

A continuous line L1 in FIG. 9 indicates the friction force generated when the regulating surface 42 and the regulated surface 54 shown in FIG. 8 are brought into contact with each other and a load in the direction orthogonal to the axial direction is applied to the regulated surface 54 so that the regulated surface 54 is moved in parallel with the direction orthogonal to the axial direction. A long dashed double-short dashed line L2 in FIG. 9 indicates the friction force generated when the regulating surface 42 and the conventional regulated surface 540 shown in FIG. 6 are brought into contact with each other and a load in the direction orthogonal to the axial direction is applied to the conventional regulated surface 540 so that the conventional regulated surface 540 is moved in parallel with the direction orthogonal to the axial direction.

As shown by the long dashed double-short dashed line L2, a difference Δµ between the maximum static friction force and the dynamic friction force is large in the conventional regulated surface 540. Thus, the stick-slip occurs. As shown by the continuous line L1, the difference Δµ between the maximum static friction force and the dynamic friction force is substantially zero in the regulated surface 54. In other words, the stick-slip is less likely to occur since the change between the maximum static friction force and the dynamic friction force is smooth.

The steering device 1 provides the following effects.

(1) In the ball joint 50, the regulated surface 54 has a shape that recedes with respect to the regulating surface 42 toward the outer side of the socket 51 from the position at a predetermined distance away from the base of the screw 53 in the regulating surface 42. The regulated surface 54 has a curved surface shape. It has been confirmed through tests conducted by the inventors of the present application that the pointed portion toward the regulating surface 42 is less likely to be formed on the regulated surface 54 even if the processing error occurs in the processing for forming the regulated surface 54 of the socket 51.

Thus, the pointed portion toward the regulating surface 42 is not present on the regulated surface 54 of the socket 51. Therefore, even if the rack shaft 30 is deflected and deformed so that the regulated surface 54 of the socket 51 is strongly pushed against the regulating surface 42, a part of the socket 51 is less likely to strongly bite into the regulating surface 42. Thus, the stick-slip is less likely to occur even if the regulated surface 54 moves on the regulating surface 42 while the regulated surface 54 is contacting the regulating surface 42 along with the deformation of the rack shaft 30 so as to eliminate the deflection.

Furthermore, the pointed portion toward the regulating surface 42 is less likely to be formed on the regulated surface 54 even if the processing error occurs in the processing for forming the regulated surface 54. Thus, it is possible to suppress an increase in the number of times of processing while suppressing the stick-slip.

(2) The socket 51 is less likely to wear since the hardness of the socket 51 is higher than the hardness of the rack housing 40. Thus, even if a period of using the ball joint 50 is increased, the possibility that the pointed portion will be formed on the socket 51 is low. The effect of suppressing the occurrence of the stick-slip is thus continuously obtained.

(3) The screw vicinity portion 57 is orthogonal to the axial direction of the screw 53. The end face of the rack shaft 30 is orthogonal to the longitudinal direction of the rack shaft 30. Thus, a tightening torque needed when the screw 53 is screwed into the screw hole 33 can be set nearly the same as the conventional tightening torque.

A specific mode that may be adopted for the present ball joint is not limited to the mode illustrated in the embodiment described above. For the present ball joint, various modes different from the embodiment described above may be adopted within such a scope that the object of the present invention is achieved. A modification of the embodiment described below is an example of the various modes that may be adopted for the present ball joint.

Figure 10:
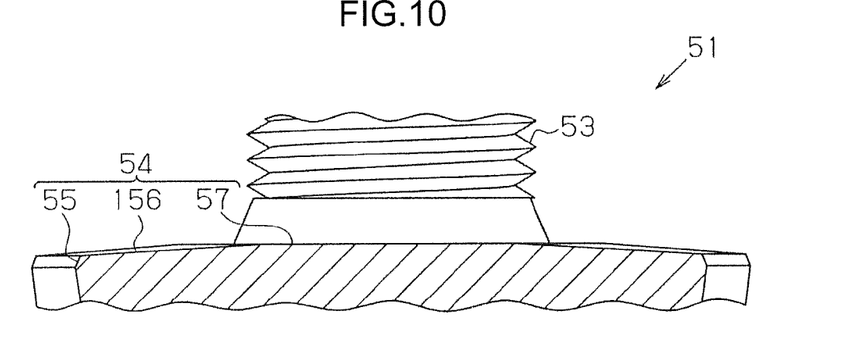
FIG. 10 is a sectional view showing an intermediate portion of a regulated surface according to a modification of the present invention, exaggerated in the height direction.
Figure 11:
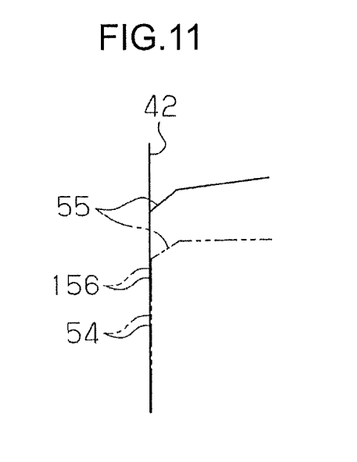
FIG. 11 is an operation diagram showing an operation of the regulated surface and the regulating surface according to the modification of the present invention.

As shown in FIG. 10, the intermediate portion 56 forming the curved surface is changed to a linearly inclined intermediate portion 156. The intermediate portion 156 recedes with respect to the regulating surface 42. As shown in FIG. 11, when the deflection of the rack shaft 30 is eliminated while the regulated surface 54 is being pushed against the regulating surface 42, the regulated surface 54 moves from a position indicated by a continuous line to a position indicated by a long dashed double-short dashed line while rubbing against the regulating surface 42. In this case, a corner is formed between the intermediate portion 156 and the outer circumferential edge 55. However, the regulated surface 54 is pushed against the regulating surface 42 by the force acting on the rack shaft 30 toward the rack housing 40 side. Thus, it is assumed that the intermediate portion 156 and the regulating surface 42 make a surface contact with each other so that the corner is less likely to be caught on the regulating surface 42. The maximum static friction force between the regulated surface 54 and the regulating surface 42 thus is small. The difference between the maximum static friction force and the dynamic friction force is small compared to the conventional regulated surface 540 (see FIG. 6). Therefore, the stick-slip is less likely to occur.

Figure 12:
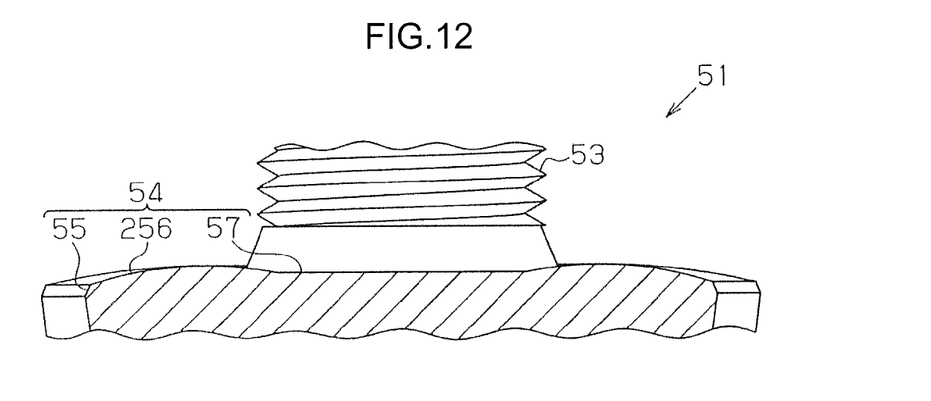
FIG. 12 is a sectional view showing the intermediate portion of the regulated surface according to a modification of the present invention, exaggerated in the height direction.

As shown in FIG. 12, the intermediate portion 56 that recedes with respect to the regulating surface 42 toward the outer circumferential edge 55 may be changed to an intermediate portion 256 having a spherical shape, in which a portion between the outer circumferential side and the inner circumferential side bulges the most. In this case, the spherical portion is formed so that the pointed portion is substantially not formed at the portion that contacts the regulating surface 42, whereby the stick-slip is less likely to occur.

The chamfering of the outer circumferential edge 55 may be omitted. In this case, the intermediate portion 56 continues up to the outer circumference of the regulated surface 54.

The screw vicinity portion 57 may be inclined with respect to the axial direction of the screw 53. Furthermore, the screw vicinity portion 57 may be curved.

The entire regulated surface 54 may be formed as the intermediate portion 56.

Figure 13:
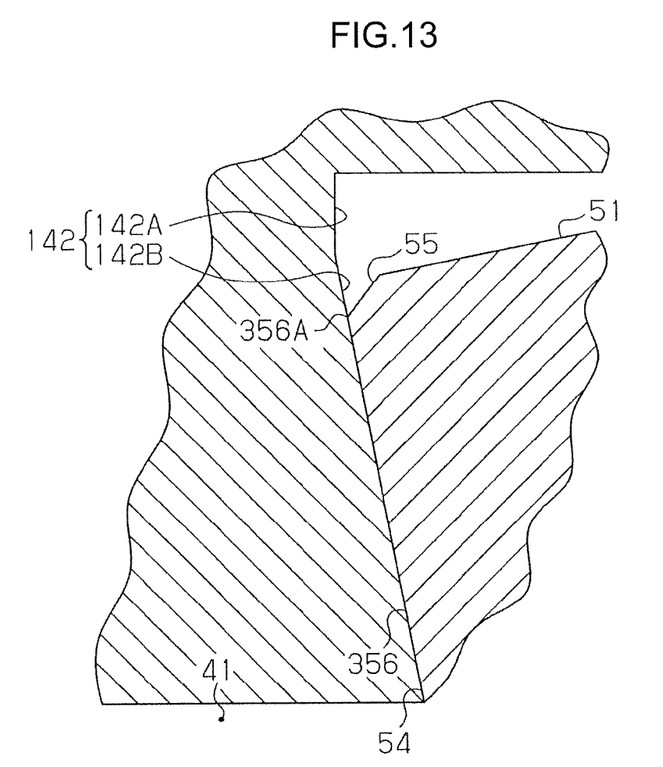
FIG. 13 is an operation diagram showing an operation of the regulated surface and the regulating surface according to the modification of the present invention.

As shown in FIG. 13, a regulating surface 142 including an inner circumferential portion 142B on the internal space 41 side and an outer circumferential portion 142A on an outer circumferential side may be adopted. The inner circumferential portion 142B is linearly inclined with respect to the longitudinal direction of the rack shaft 30 so as to recede with respect to the regulated surface 54 from the rack shaft 30 side toward the side away from the rack shaft 30. According to this modification, for example, if the regulated surface 54 including an intermediate portion 356 orthogonal to the axial direction of the screw 53 is adopted, the rack shaft 30 is deflected in the direction orthogonal to the axial direction so that a corner 356A formed between the intermediate portion 356 and the outer circumferential edge 55 is directed toward the inner circumferential portion 142B. In this case, the inner circumferential portion 142B is inclined to lie along the regulated surface 54. Thus, compared to the case in which the inner circumferential portion 142B is orthogonal to the longitudinal direction of the rack shaft 30, the regulated surface 54 and the inner circumferential portion 142B are easily brought into surface contact with each other and the corner 356A is less likely to be caught at the inner circumferential portion 142B. The maximum static friction force between the regulating surface 142 and the regulated surface 54 thus can be reduced. Furthermore, the stick-slip is less likely to occur. In this modification, the regulated surface 54 including the intermediate portion 56 shown in FIG. 7 may also be adopted.

When the modification shown in FIG. 13 is adopted, the socket 510 including the conventional regulated surface 540 shown in FIG. 5 may be adopted. In this case as well, the conventional regulated surface 540 and the inner circumferential portion 142B are easily brought into surface contact with each other. Thus, the maximum static friction force between the regulating surface 142 and the regulated surface 540 can be reduced. Therefore, the stick-slip is less likely to occur.

In the modification shown in FIG. 13, the inner circumferential portion 142B may be curved.

A lubricating agent such as grease may be applied to the regulated surface 54. In this case, the boundary between the regulating surface 42 and the regulated surface 54 is lubricated by the lubricating agent. Thus, when the rack shaft 30 is deformed to eliminate the deflection, the stick-slip is even less likely to occur.

The turning mechanism 20 may be changed to a ball screw type turning mechanism. In other words, any turning mechanism may be adopted as long as the turning mechanism includes a shaft that moves in the longitudinal direction.

The ball joint 50 may be applied to a ball joint used in devices other than the steering devices.

According to the ball joint and the steering device including the joint of the present invention, the stick-slip is less likely to occur.

What is claimed is:

1. A ball joint comprising:
   a socket that includes a regulated surface, the regulated surface being an end face of the socket configured to contact a regulating member arranged at a periphery of a shaft, the socket being provided with a connecting portion projecting from the regulated surface, the regulated surface contacting a regulating surface that is an end face formed on the regulating member so that movement of the shaft is regulated; and
   a ball fitted in the socket, wherein:
   the regulated surface comprises:
      a screw vicinity portion that is orthogonal to an axial direction of the connecting portion, the screw vicinity portion having an outer diameter that is equal to an outer diameter of an end face of the shaft;
      an intermediate portion that is curved and extends continuously from the screw vicinity portion such that the intermediate portion recedes with respect to the regulating surface in an axial direction toward a radially outer side of the socket from a base of the connecting portion in the regulated surface or from a position at a predetermined distance away from the base in a radial direction,
   the intermediate portion extends from the screw vicinity portion defining a radially innermost side and a radially outermost side such that the radially innermost side borders the screw vicinity portion; and
   the regulating surface does not oppose the radially innermost side of the intermediate portion and the regulating surface opposes the radially outermost side of the intermediate portion.

2. The ball joint according to claim 1, wherein a hardness of the socket is higher than a hardness of the regulating member.

3. A steering device comprising:
   a regulating member that is a housing for accommodating a shaft; and
   the ball joint according to claim 2;

wherein the shaft is arranged in the housing so as to be movable in a longitudinal direction of the shaft with respect to the housing.

4. A steering device comprising:
a regulating member that is a housing for accommodating a shaft; and
the ball joint according to claim 1;
wherein the shaft is arranged in the housing so as to be movable in a longitudinal direction of the shaft with respect to the housing.

5. The ball joint according to claim 1, wherein:
the regulated surface comprises an outer circumferential edge having a radially innermost side and a radially outermost side;
the intermediate portion defines a first height between the radially innermost side and the radially outermost side of the intermediate portion,
the outer circumferential edge defines a second height between the radially innermost side and the radially outermost side of the outer circumferential edge,
the first height is smaller than the second height;
the radially outermost side of the outer circumferential edge does not contact the regulating surface.

6. The ball joint according to claim 1, wherein the regulating surface contacts a portion of the intermediate portion and does not contact the radially outermost side of the intermediate portion.

7. The ball joint according to claim 1, wherein the regulating surface has a larger diameter than the socket.

* * * * *